United States Patent [19]

Assaf et al.

[11] Patent Number: 4,742,682
[45] Date of Patent: May 10, 1988

[54] ENERGY-SAVING, DIRECT-CONTACT, PARALLEL-FLOW HEAT EXCHANGER

[75] Inventors: Gad Assaf, Rehovot; Lucien Bronicki, Yavne, both of Israel

[73] Assignee: Geophysical Engineering Co., Seattle, Wash.

[21] Appl. No.: 349,767

[22] Filed: Feb. 18, 1982

[51] Int. Cl.⁴ ............................................. F03G 7/00
[52] U.S. Cl. ............................ 60/641.1; 60/641.6; 60/641.11; 60/649; 60/692
[58] Field of Search ............... 60/641.8, 641.9, 641.11, 60/641.12, 641.13, 641.14, 641.6, 641.2, 690, 692, 649, 641.1

[56] References Cited

U.S. PATENT DOCUMENTS 3,894,393  7/1975  Carlson ........................... 60/641.11
4,106,295  8/1978  Wood ................................ 60/682 X Primary Examiner—Allen M. Ostrager
Attorney, Agent, or Firm—Sandler & Greenblum

[57] ABSTRACT

An energy-saving, direct-contact parallel-flow heat exchanger includes a vertically oriented tower open at the top and bottom for defining a gas-flow conduit. A spray-head adjacent to the top of the tower sprays droplets of relatively warm brine into the air which flows downwardly in response to drag forces being exerted by the falling droplets and is compressed as a heat-exchange process takes place between the air and the droplets. The cooled droplets that fall to the bottom of the tower are collected and separated from the air. An air turbine associated with the tower produces energy in response to the downward flow of air in the tower.

17 Claims, 2 Drawing Sheets

ENERGY-SAVING, DIRECT-CONTACT, PARALLEL-FLOW HEAT EXCHANGER

TECHNICAL FIELD

This invention relates to a direct-contact, parallel-flow heat exchanger, and, more particularly, to a vertically oriented heat exchanger in which a relatively warm liquid, such as condenser cooling water, is cooled by direct contact with air.

BACKGROUND ART

Conventional power plants generally recirculate condenser cooling water by utilizing cooling towers in which relatively warm water from a condenser is pumped to the top of a cooling tower and sprayed into the tower where the water makes direct contact with upwardly rising cooler air. During its downward traverse of the cooling tower, the water is cooled; and at the bottom, the cooled water is recycled to the condenser. This approach to cooling condenser water is utilized in power plants of all sizes from large-scale nuclear power plants generating power in the thousands of megawatts to small-scale, conventional power plants of more modest power range.

The energy expended in pumping condenser water to a cooling tower has been considered, heretofore, as not recoverable; but the percentage this loss bears to the total power generated is usually so small that the economics of the power plant do not justify taking steps to recover some of the pumping losses. Such losses for condenser water cooling can amount to a more significant percentage of the output of a power plant of the type which utilizes small thermal heads, such as plants which operate on geothermal, solar, or waste heat. Therefore, considerable interest exists in increasing the efficiency of such types of power plants; and the recovery of some of the condenser water pumping losses is an area of interest.

It is an object of the present invention to provide a new and improved energy-saving, direct-contact, parallel-flow heat exchanger which will increase the efficiency of a power plant by recovering some of the pumping power associated with cooling condenser water.

DISCLOSURE OF INVENTION

A heat exchanger according to the present invention utilizes a vertically oriented tower open at the top and bottom for defining a gas-flow conduit. A spray-head adjacent to the top of the tower sprays droplets of relatively warm liquid into gas entering the tower at the top; and collection means adjacent to the bottom of the tower collect relatively cooler droplets that fall to the bottom of the tower. Finally a gas-flow turbine associated with the tower produces energy in response to the downward flow of gas in the tower.

Gravity acting on the liquid droplets causes the droplets to compress the gas in the tower establishing a pressure differential between the inlet and exit of the tower which is functionally related to the drag forces on the droplets. The resulting pressure head can be converted into work by a gas-flow turbine located either at the exit of the tower, or at its entrance.

The heat flux between the droplets and the gas is dependent upon the thermal head between the droplets and the gas; and the vapor-mass flux associated with the latent heat flux is dependent upon the difference in vapor concentration between the surface of the droplets and the gaseous environment. The heat and vapor fluxes, and the drag forces acting between the droplets and their environment are such as to provide a cooling of the liquid even when the gas temperature exceeds the temperature of the liquid at the spray-head provided only that the gas is relatively dry. In other words, when the present invention is applied to cooling condenser water in a cooling tower, the invention is applicable to an arid environment having air, hotter than the water to be cooled, if the relative humidity of the ambient air is low. The large latent heat flux that occurs as the hot air absorbs water vapor will result in a cooling of the water and the discharge of relatively cooler moist air from the bottom of the tower. In more temperate environments where the temperature of the air is cooler than the condenser water, sufficient sensible heat-transfer will occur for cooling the water in the cooling tower and discharging warmer and moister air from the cooling tower.

Under most circumstances, the amount of energy recovered utilizing the compression of the air in the cooling tower due to the falling droplets will be about 50% of the power expended on pumping the water to the top of the cooling tower.

The apparatus of the present invention is also useful for accelerating the concentration of brine using an evaporating pond that is part of an industrial chemical process. In such case, brine from the evaporation pond is sprayed into the cooling tower in an arid environment, cooled by the interaction with the air, and then returned to the evaporation pond, whose temperature is thus reduced. Consequently, the evaporation pond becomes more efficient in evaporating water, thereby speeding up the production of brine of a given concentration. This arrangement can be used to substantially reduce the size of an evaporating pond in connection with industrial operations, or to reduce the time required to obtain concentrated brine.

In humid environments, spraying brine into relatively humid and cooler air will result in the condensation of water vapor in the air onto the brine droplets thereby drying and heating the air. The resultant warm air may be channeled to an updraft chimney where the flow of air drives an air turbine for recovering a part of the energy used to spray the brine into the tower. Alternately, or in addition, the warmed, dry air can be used for space heating.

The present invention is also applicable to large-scale power generation when a source of hot brine is available in an arid environment. The Great Salt Lake in the United States would make an ideal location. In such case, a plurality of heat exchangers of the type described above would be built on the shore next to the Lake, and warm brine from the Lake would be sprayed into the top of each heat exchanger. The air at the bottom of the heat exchangers discharges into the base of a chimney whose cross-sectional area is equivalent to the total cross-sectional area of all of the heat exchangers. The hydraulic diameter of the chimney is preferably greater than about 20% of the height of the chimney; and, as a result, the plume produced by the upwardly rising air in the chimney causes the effective height of the chimney to be about 50% more than its actual height. As a consequence, the total power plant output available from the air turbines located at the heat exchangers will be more than 2.5 times greater than under the condition where the hydraulic diameter of the chimney is much less than about 20% of the chimney height.

BRIEF DESCRIPTION OF THE DRAWINGS

Embodiments of the present invention are shown in the accompanying drawings wherein.

DETAILED DESCRIPTION

Figure 1:
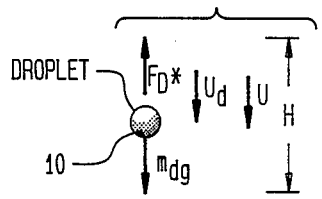
FIG. 1 is a schematic drawing showing the forces acting on a water droplet as it falls under the acting on a water droplet as it falls under the influence of gravity.

Referring now to FIG. 1 of the drawings, reference numeral 10 designates a water droplet having a mass $m_d$ and acted on by gravity which exerts on the droplet a downward force of magnitude $m_d g$. If the droplet is falling downwardly with a velocity $u_d$ in an air stream whose velocity is u, the drag force acting on the droplet is upwardly and is designated $F_D^*$. The net upward force acting on the droplet is:

$$F^* = F_D^* - m_d g \quad (1)$$

From aerodynamic considerations, it can be shown that the drag force acting on a droplet of radius r in a gaseous environment whose density is $\rho_a$ with a viscosity $\mu_a$ is:

$$F_D^* = [C_D \rho_a \pi r^2 (u - u_d)|u - u_d|]/2 \quad (2)$$

where the quantity $C_d$ is the drag coefficient for the droplet in the gaseous environment and is dependent on the Reynolds number, which is a function of the cross-section dimension of the droplet, the density of the gaseous medium, and on its viscosity.

If one considers a unit volume of the gaseous medium containing the spray droplets, then the total force acting within the unit volume is:

$$F = nF^* \quad (3)$$

where the quantity n is the number of droplets per unit volume. If the quantity $m_s$ is defined as the ratio of the mass of water to the mass of air in a unit volume, then the total force acting on the droplets in the unit volume is:

$$F_D = [3 m_s C_D \rho_a^2][(u-u_d)|u-u_d|]/(8r\rho_1) \quad (4)$$

where the quantity $\rho_1$ is the density of the liquid. Consequently, the total upward force F on the droplet in a unit volume is:

$$F = F_D - m_s \rho_a g \quad (5)$$

The equation of motion for the gas is as follows:

$$(du/dt) = -(dp/dZ) - F_D - \rho_a g \quad (6)$$

If it is assumed that the velocity of the gas is constant, then the left side of Eq. (6) is zero, with the following formula:

$$dp = -F_D dZ - \rho_a g dZ \quad (7)$$

Thus, the pressure differential $\Delta p$ across a height H is:

$$\Delta p = p(H) - p(0) = -\int_0^H F_D dZ - \rho_a g H \quad (8)$$

Eq. (8) can be rewritten as:

$$\Delta p = \Delta p_D + \Delta p_0 \quad (9)$$

where $\Delta p_0 = -\rho_a g H$ and represents the hydrostatic pressure drop, and $$\Delta p_D = -\int_0^H F_D dZ = -F_D H,$$

and represents the pressure drop due to the drag action of the air on the droplets. Usually, after a short period of time, the total upward force F on the droplet will vanish, and Eq. (5) reduces to $F_D = m_s \rho_a g$. From Eq. (9), it follows that $\Delta p_D = -m_s \rho_a g H$, which shows that the drag action of the air on the droplets induces an extra pressure drop in the upward direction. Stated otherwise, the pressure increases in the downward direction; and the system described above acts as a compressor.

U.S. patent application Ser. No. 97,439, filed Nov. 26, 1979, (P2329) is based on an upward air flow which lifts droplets, producing a pressure drop which is recovered via the buoyancy of the droplets. In other words, the air flows upwardly toward a lower pressure and transfers its energy to the droplets. This energy can then be converted into kinetic energy by the downward flow of the recovered droplets.

In the present invention, the opposite situation is involved wherein the droplets push the air towards the exit, creating positive pressure energy in the air, which can be recovered by useful work. In other words, when the droplets fall downwardly, they compress the air during its downward flow.

The downward velocity of the air is related to the pressure differential as follows:

$$u = [(-2\Delta p)/\rho_a]^{0.5} = [(2gm_s H)]^{0.5} \quad (10)$$

Finally, the power R recovered by the turbine due to the pressure head $\Delta p$ is:

$$R = n_t u \Delta p_D = n_t (\rho_a/2)(2gm_s H)^{1.5} [\text{watts/m}^2] \quad (11)$$

where the quantity $n_t$ is the efficiency of the turbine.

It can be shown that the power required to pump a unit volume of water through the head H to a spray-nozzle in which the head consumed in the nozzles is $h_n$ is:

$$P = \rho_a [g m_s u_d (H + h_n)]/n_p \quad (12)$$

Therefore, the fraction f of energy recovered by a turbine by utilizing the pressure head created by the falling droplets with respect to the pumping energy required to spray the droplets into the air is the ratio of the quantities set forth in Eqs. (11) and (12), namely:

$$f = (R/P) = (\eta_p \eta_t uH)/[(H+h_n)u] \quad (13)$$

The heat flux q between the droplets and the gas is given by:

$$q=nK_aC_p(2\pi r)(2+0.57Re^{0.5}Pr^{0.33})(T_d-T_a)[\text{watts}/m^3] \quad (14)$$

where the quantity Re is Reynolds number and the quantity Pr is the Prantle number which, for air, is approximately unity. The quantity $K_a$ is the heat conductivity of the gas and the quantity $C_p$ is its specific heat. The quantity $T_d-T_a$ is the thermal head between the droplets and the gas.

The vapor mass flux m associated with the latent heat flux is:

$$q_L=Lm=Ln2\pi rK_v(2+0.57Re^{0.5}Pr^{0.33})(C_d-C) \quad (15)$$

where the quantity L is the latent heat of vaporization of the liquid, the quantity m is the vapor mass flux from the droplets and the quantity $C_d-C$ is the vapor concentration difference between the surface of the droplets and the environment. The total heat flux is the sum of Eqs. (14) and (15):

$$Q=q+q_L \quad (16)$$

Eqs. (5), (14) and (15) relate the drag forces and the heat and vapor fluxes between the droplets and their environment. Usually, the droplets are utilized for direct heat and mass transfer and this may define a maximum droplet size. However, the formation of the droplets requires surface energy, with a result that the smaller droplets, the larger the surface energy that must be applied to the liquid. It can be shown that, for water, the surface energy to achieve a droplet of a radius 1 mm is approximately 0.3 joules/Kg which is the equivalent of elevating 1 Kg of water a distance of 3 cm. Thus, as long as the droplet radius exceeds 0.1 mm, the surface energy and thus the energy required to create the droplets is quite small.

In applying the above mathematical discussion to a practical device such as a cooling tower in which droplets of water are sprayed into a vertical air column, certain simplifying assumptions can be made for a first approximation of an actual device. Thus, the initial acceleration can be neglected and it can be assumed that the droplets are suspended in the air flow, i.e., the difference in velocity between the droplets and the air approaches zero and the droplets fall at terminal velocity. In such case, it can be shown that the air velocity will be of the order of magnitude of 15 m/sec which is the terminal velocity of the droplets. On the basis of these assumptions, it can be concluded that:

$$m_sC_1(T_{in}-T_{dis})=[\rho_aC_a+L(dC/dT)]\Delta T_a=C^*\Delta T_a \quad (17)$$

where $C_1$32 4200 joule/Kg (the specific heat of liquid water), $T_{in}$ is the inlet water temperature, $T_{dis}$ is the discharge water temperature, $C_a$ is the specific heat of air (1000 joules/Kg), C is the saturated vapor concentration of liquid at the air temperature, and $\Delta T_a$ is the heating range of air. The quantity $C^*$ may be defined as the extended heat capacity of the air and it has the following values:

$C^*=5{,}600$ j/m³/°C. at $T_a=30°$ C.
$C^*=4{,}100$ j/m³/°C. at $T_a=20°$ C.
$C^*=2{,}670$ j/m³/°C. at $T_a=10°$ C.

For an order of magnitude estimate, it can be assumed that $C^*/C_1=1$, which is to say that the spray density is approximately 1 Kg/m³, which is the value of the air density. From equation (17) it can be seen that the temperature range of the air will be of the same order as the temperature range of the water.

From equation (14), it can be seen that for a spray density of unity, for $2.9\times10^8$ droplets per cubic meter and for $K_a=K_v=1.5\times10^{-5}$ m²/sec, and for r=0.1 mm, the heat flux between the droplets and the gas is approximately 14 KW/m³/°C. and the vapor mass flux is approximately 41 KW/m³/°C. Thus, for a temperature difference of only 1° C. between the droplets and the gas, and for a ratio of the vapor concentration difference between the surface of the droplets and their environment to the temperature difference between the droplets and the air equal to 1 g/m³/°C., the sensible heat and the latent heat flux will be very large. Therefore, one can conclude that at the exit of the spray, the difference between the air temperature and the water temperature may be less than 1° C.

The principles described above can be applied in a practical sense to a cooling tower for a power plant. Referring to FIG. 2, reference numeral 12 designates a cooling tower according to the present invention comprising a vertically oriented tube 13 which, for the purposes of an example, may be 10 m high and supported in a conventional manner (not shown). Tube 13 is open at top 14 and at bottom 15 with which a plurality of diffuser sections 16 may be associated, the combined throat area of all of the diffuser sections being equal to the cross-sectional area of tube 13. Spray-head 17 is located adjacent top 14 of the tube for spraying droplets of relatively warm water into air entering the top open end. These droplets are in cloud form as indicated by reference numeral 18.

The droplets fall downwardly in the tower under the influence of gravity and are collected by a plurality of collection plates 19 located adjacent to the bottom of the tower. Plates 19 form collection means that collect the water droplets, permitting them to be conveyed via pipe 20 to a point outside the tower. Finally, air turbogenerator 21 located at the inlet of tube 13 is provided for producing energy in response to the downward flow of air in the tube. Alternatively, air turbogenerators may be placed at the entrance to diffuser sections 16.

EXAMPLE I

With water droplets of radius 0.1 mm, and a drift velocity (difference between droplet and air speed) of 1 m/sec, a tower height of 10 m and a nozzle-head of 3 m (which is 1/10 of the droplet surface energy), assume that air entering the cooling tower at 35° C. contains 14 g/m³ of water vapor. It will exit tower at 27° C. and 27 g/m³ of water concentration. In this case, water entering the tower at 34° C. will exit from the tower at 28° C. when the spray density is unity. In such case, the air velocity will be about 14 m/sec and the pumping power will be approximately 2300 watts/m² where the power is related to the cross-sectional area of the tower. The recovered energy for the output of turbogenerator 21 in such case will be about 1100 watts/m², which is about 50% of the pumping power. The heat release from the water to the air is approximately 378 KW/m² and the ratio of the net input work to the net heat release from the water will be $3 \times 10^{-3}$, which is a measure of the efficiency of the tower. If the tower were a heat sink for a solar pond power plant, which converts heat from a solar pond to electrical energy with an efficiency of about 6%, then about 5% of the turbine output of the power plant would be utilized by the cooling tower.

EXAMPLE II

In this example, it is assumed that air enters the tower at 20° C. with a water vapor concentration of 12 g/m³ and exits at 24° C. with a water vapor concentration of 22 g/m³. Here, the mixing ratio is assumed to be 0.6 kg/m³, and in such case, for a 10 m tower, the air velocity will be about 11 m/sec. In this case, water entering at 35° C. will be discharged at 25° C. The pumping power required is 936 watts/m², and about 528 watts/m² will be recovered by the turbine. The net power required as input to the cooling tower is about 408 watts/m². The heat transferred is 302,000 watts/m², which provides a ratio of net input work to net heat released of about $1.35 \times 10^{-3}$.

Figure 2:
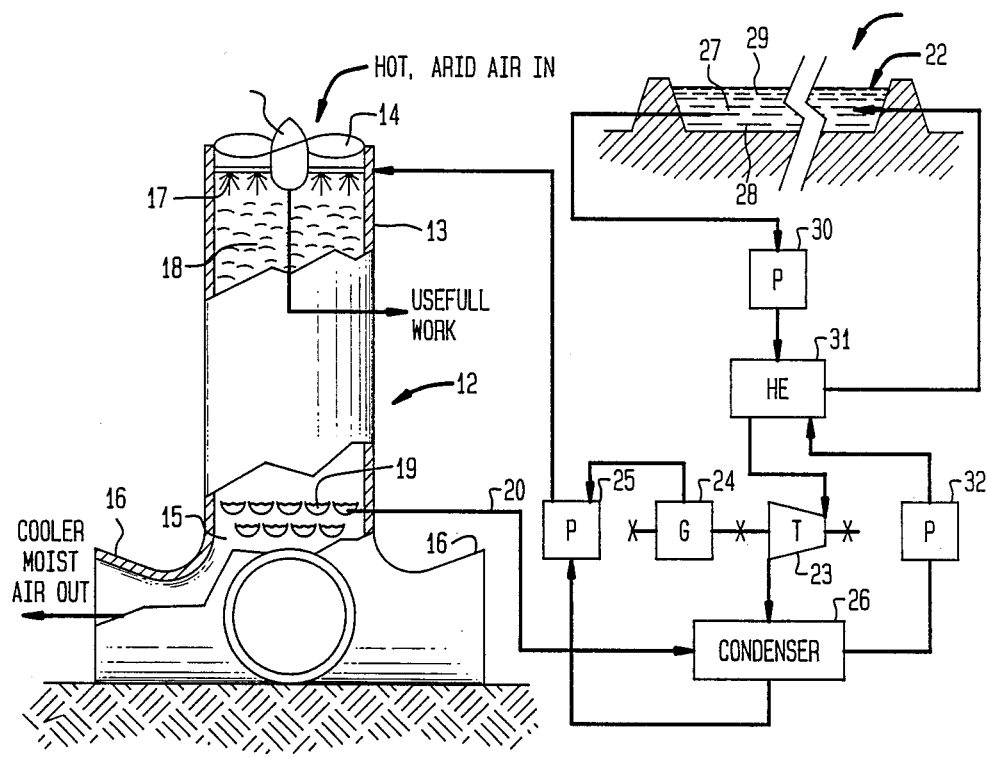
FIG. 2 is a first embodiment of the present invention applied to a cooling tower for cooling condenser water associated with a solar pond power plant.

Referring once again to FIG. 2, cooling tower 12 is associated with solar pond power plant 41 which includes solar pond 22 and a closed Rankine-cycle turbine 23 which drives generator 24 for producing useful work. A portion of the output of the generator is applied to pump 25 which is also supplied by the output of air turbogenerator 21 for the purpose of pumping cooling water from condenser 26 to spray-head 17 at the top of tower 12.

Solar pond 22 is shown as a solar salt pond in which solar radiation is absorbed by a halocline 27 which covers heat storage layer 28 of the pond. Wind mix layer 29 at the surface of the pond provides the interface with ambient conditions.

In operation, pump 30 draws hot brine from heat storage layer 28 and passes the brine through heat exchanger 31. The cooled brine is then returned to the heat storage layer in a conventional manner. The closed Rankine-cycle turbine may operate on an organic fluid such as Freon or the like, pump 32 passing liquid working fluid into heat exchanger 31 where the liquid working fluid is vaporized. The vaporized working fluid is expanded in turbine 23, which drives generator 24. The expanded vapors are transferred to condenser 26 where cooling water condenses the exhaust vapors from the turbine, and the cycle repeats.

Figure 3:
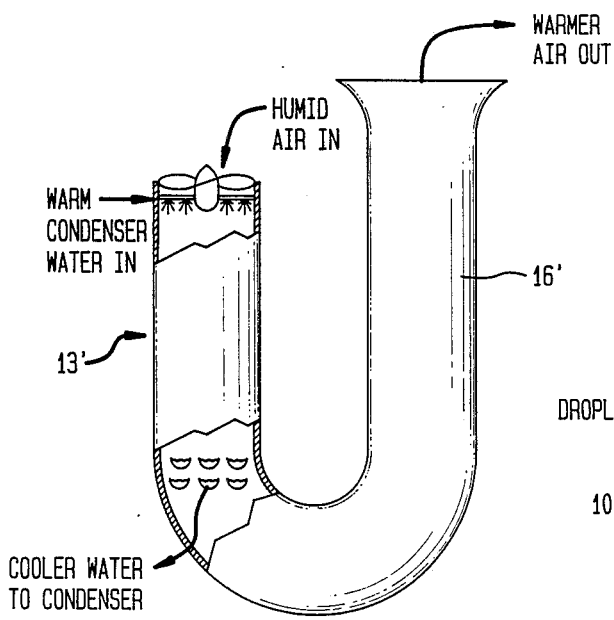
FIG. 3 is a second embodiment of the present invention suitable for use in temperate climates.

In Example I, the air exits tower 12 at ground level because it is cooler and heavier than the ambient air, and will not mix with the air entering the tower. In the case of Example II, however, the air exhausted from the tower will be warmer and lighter than surrounding ambient air, and may interfere with air entering the tower. As a consequence, the configuration for the cooling tower described in Example II may be in the form shown in FIG. 3 where cooling tower 13' is shown. In this embodiment, diffuser section 16' is elevated above the bottom of the tower. For a cooling tower about 10 m high, the diffuser section could be 25 m high, which will allow suitable separation between the air entering and the air leaving the system.

Figure 4:
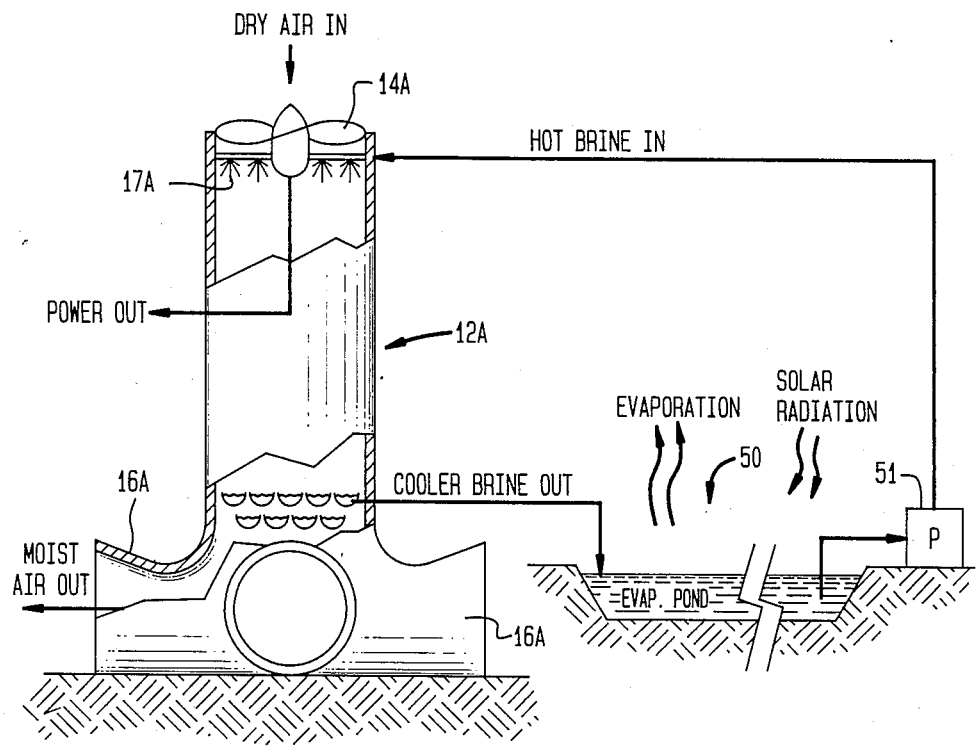
FIG. 4 is a schematic illustration of the present invention applied to an evaporating pond for the purpose of increasing the rate of evaporation from the pond by cooling the brine.

The heat exchanger shown in FIG. 1 can be used, as shown in FIG. 4, to accelerate the concentration of brine using an evaporation pond that is part of an industrial chemical process. Reference numeral 12A designates a cooling tower such as that shown in FIG. 1 located adjacent evaporation pond 50, containing brine of a given concentration exposed to ambient conditions in a hot, arid climate. At the latitude of southern California, the solar input in July is about 311 watts/m² at noon. If the water in the pond were fresh, its temperature would be about 32° C.; and the energy lost due to evaporation of the water would be about 270 watts/m², there being about 41 watts/m² lost by reason of radiation, etc. Based on this evaporation loss, the level would drop by about 29 cm/month. On the other hand, if the pond contained brine at about a 30% concentration, its temperature would be about 39° C.; and, due to the lower vapor pressure, the energy lost due to evaporation would be only about 168 watts/m², equivalent to a drop in water level of about 18 cm/month. If the brine had a concentration of about 37%, only about 97 watts/m² would be lost by evaporation, amounting to a drop of only about 10 cm/month. Thus, the more concentrated the brine, the less effective is the pond for evaporating water.

With the arrangement shown in FIG. 4, hot brine is drawn from pond 50 by pump 51 and delivered to spray-head 17A of tower 12A. The situation is similar to Example I described above, where hot, dry air is drawn downwardly through air-turbine 14A by the falling droplets. A heat-exchange process takes place between the droplets and the air during their downward passage through the heat exchanger, resulting in cooler, moister air exiting through diffusers 16A, and cooler brine being returned to the pond.

About 30 watts/m² must be removed from the brine in the heat exchanger in order to reduce the brine temperature by about 2° C. In such case, the latent heat flow for a 30% brine would be increased by about 18% (i.e., from 168 watts/m² to 198 watts/m²). Conservatively, the energy required for pumping the brine and spraying it would be about 0.3 watts/m². Thus, on an annual basis, about 2.5 KWhr/m² of power would be expanded to increase production of the pond by 18%; and about half this power could be recovered via the air turbine. Consequently, the present invention is an ideal approach to either increasing the production of an existing pond, or maintaining the production with a smaller pond, all for a modest energy expenditure.

Figure 5:
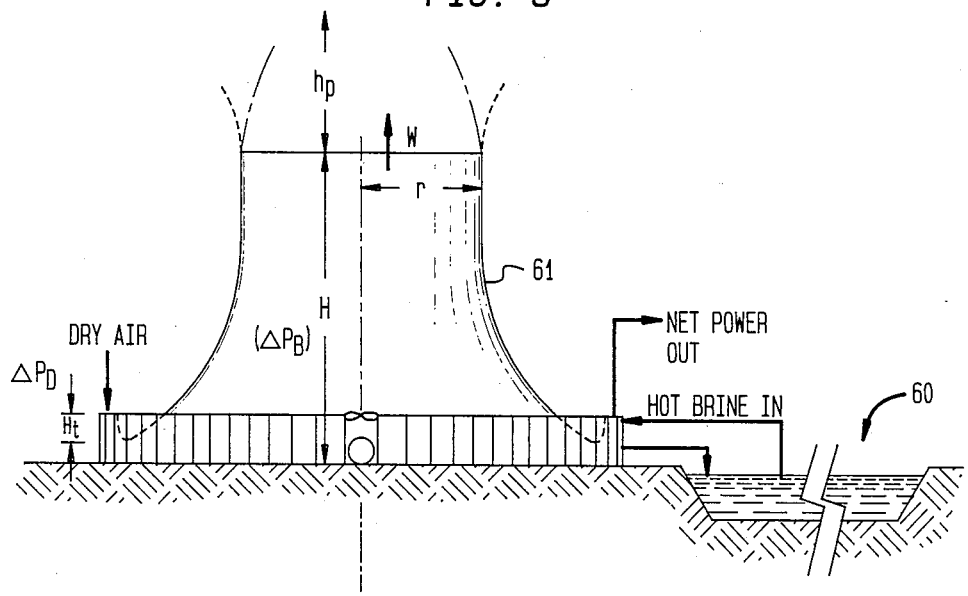
FIG. 5 is a schematic illustration of the present invention used in an evironment for large-scale power generation.

FIG. 5 shows the present invention applied to large-scale power generation when a source of low-grade heat, such as hot brine, is available in an arid climate. As shown in FIG. 5, a large number of cooling towers 12B, such as are shown in FIG. 1, are located on the shore of terminal lake 60 containing brine heated by the absorption of solar radiation. Each tower is of height $H_t$ (say, 10 m), and has an air-turbine at the top adjacent a spray-head (not shown). Preferably, the towers are arranged in a circle, and discharge into the base of chimney 61, whose cross-sectional area is about equal to the total cross-sectional area of all of the cooling towers.

As shown in the analysis presented herein, the pressure head $\Delta P_D$ due to the compression of the air caused by the falling brine droplets is $g\rho_a m_s H_t$. In a similar manner, it can be shown that the pressure drop $\Delta P_B$ across the effective length $H_e$ of the chimney is $g\rho_a(\Delta T/T)H_e$. It can be shown that the power obtained from the upward flow of air in the chimney is proportional to $H_e^{1.5}$, so that the greater the effective height of the chimney, the greater the power that can be generated.

If H is the actual height of chimney 61, and if D (=2r) is its hydraulic diameter, then, by constructing the chimney such that D>0.2H, the effective height of the chimney is about 25% greater than the actual height of the chimney. This situation arises because the plume height (i.e., the height attained by the upwardly moving air mass in the chimney after it leaves the top of the chimney) will be comparable to the actual height of the chimney. It can be shown that the plume of a chimney erodes by entrainment of ambient air at a rate proportional to the exit velocity of the gas stream exiting the chimney. If the constant of proportionality is 10%, then the height of the plume will be about 2.5 D. Thus, for the plume height to be equal to about half the actual height of the chimney (which will increase the effective height of the chimney by about 25%), the hydraulic diameter of the chimney should be greater than about 20% of the actual height of the chimney. In other words, the diameter of a 500 m chimney should be no less than about 100 m. In such case, the effective height of this chimney would be about 750 m.

It is believed that the advantages and improved results furnished by the method and apparatus of the present invention are apparent from the foregoing description of the preferred embodiment of the invention. Various changes and modifications may be made without departing from the spirit and scope of the a invention as described in the claims that follow.

What is claimed is:

1. An energy-saving heat exchanger system comprising:
   (a) a vertically oriented tower open at the top and bottom for defining a gas-flow conduit;
   (b) a spray-head adjacent the top of the tower for spraying droplets of relatively warm liquid into relatively dry gas entering the tower;
   (c) collection means adjacent the bottom of the tower for collecting relatively cooler droplets that traverse the tower;
   (d) a gas-flow turbine associated with the tower for producing energy in response to the downward flow of gas through the tower;
   (e) a closed heat exchanger connected to said collection means for receiving and heating said cooler droplets to form warmer liquid; and
   (f) means for supplying said warmer liquid to said spray head.

2. A heat exchanger system according to claim 1 wherein the gas is air, and the liquid is water, the droplet size being greater than about 0.1 mm in diameter.

3. A heat exchanger system according to claim 2 wherein the turbine is located at upstream of the spray head.

4. A heat exchanger according to claim 2 wherein the turbine is located at the bottom of the tower.

5. A heat exchanger system according to claim 3 wherein a diffuser section is located at the bottom of the tower adjacent to the collection means.

6. A heat exchanger system according to claim 5 wherein the height and cross-section of the tower is such that, in an arid climate, hot relatively dry air enters the tower at the top and cooler, moister air exits through the diffuser.

7. A heat exchanger system according to claim 4 wherein a diffuser section is elevated above the bottom of the tower.

8. A heat exchanger system according to claim 7 wherein the height and cross-section of the tower is such that, in a temperate humid climate, air enters the tower at the top and warmer and moister air exits through the diffuser.

9. A power plant comprising: a vertically oriented tower open at the top and bottom for defining a gas-flow conduit; a spray-head adjacent to the top of the tower for spraying droplets of liquid into gas entering the tower; collection means adjacent to the bottom of the tower for collecting relatively cooler droplets that traverse the tower; a gas-flow turbine associated with the tower for producing power in response to the downward flow of gas through the tower; a heat source for supplying heat to a working fluid; a heat engine responsive to the heated working fluid for converting some of the heat into work; and a water cooled condenser into which the heat engine rejects heat, the cooling water for the condenser being supplied from the collection means.

10. A power plant according to claim 9 including a pump for returning water from the condenser to the spray-head.

11. A power plant according to claim 10 wherein the heat source is a solar pond having a heat storage layer for collecting and storing low-grade heat.

12. A power plant according to claim 11 wherein the working fluid is an organic fluid, and the heat engine is a turbine that operates on a closed Rankine cycle.

13. A method for concentrating brine contained in an evaporation pond comprising the steps of spraying the brine from the evaporation pond into air at the top of a vertically oriented tower open at the top and bottom whereby a heat exchange process takes place between the air and the brine, thereby evaporating water from the brine and compressing the air, which flows downwardly, separating the brine from the air at the bottom of the tower, returning the separated brine to the evaporating pond, and passing the air that flows downwardly through an air turbine.

14. A method according to claim 13 wherein the air is dry and warmer than the brine, and the separated brine is more concentrated than the brine that is sprayed into the tower.

15. A method according to claim 13 wherein the air is humid and cooler than the brine, and the separated air is warmed by the brine.

16. A method according to claim 13 wherein the separated air is used for space heating.

17. A method according to claim 13 wherein the turbine is located at the top of the tower.

* * * * *